Nov. 14, 1961  C. B. GRADY, JR  3,008,632
CARD READING CARD PUNCH
Filed April 24, 1961  2 Sheets-Sheet 1
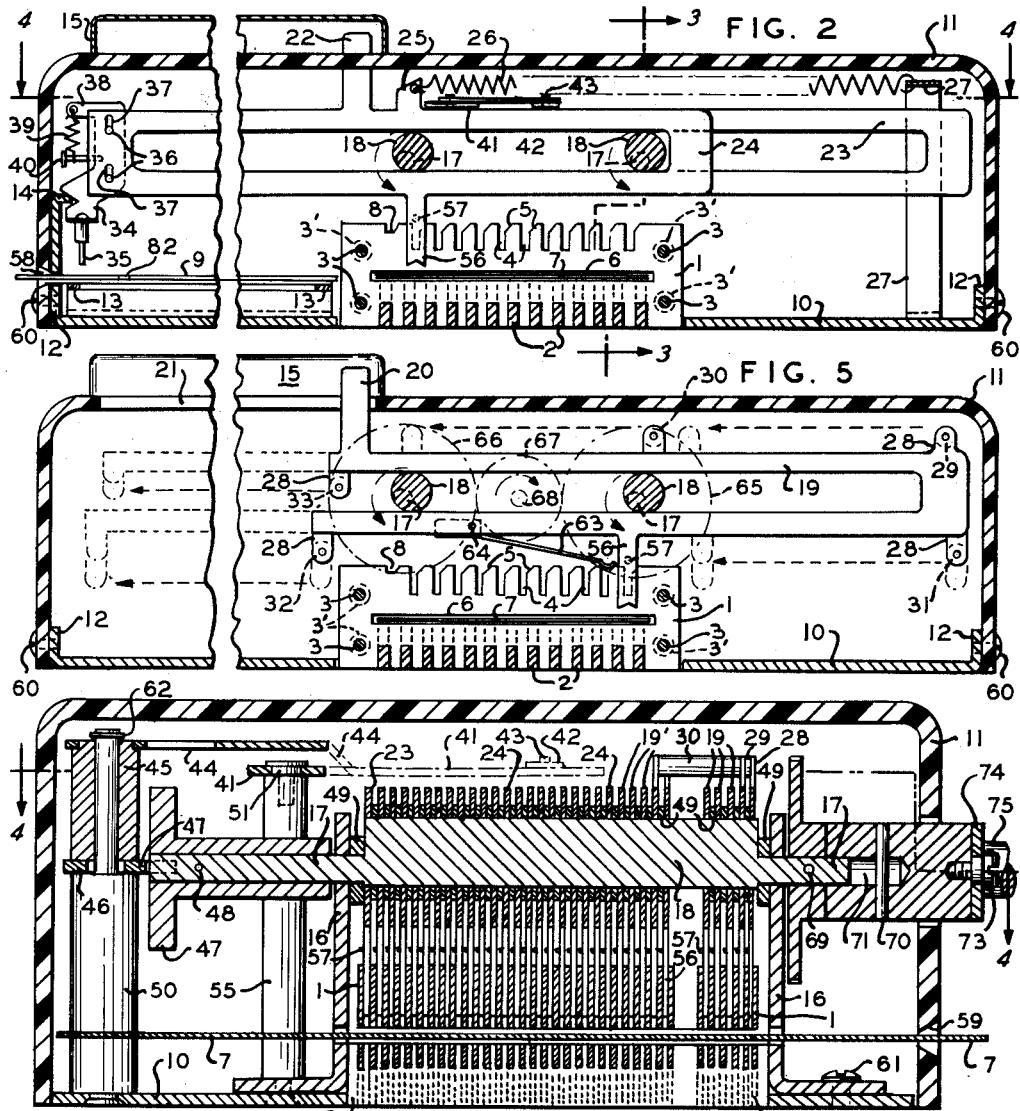
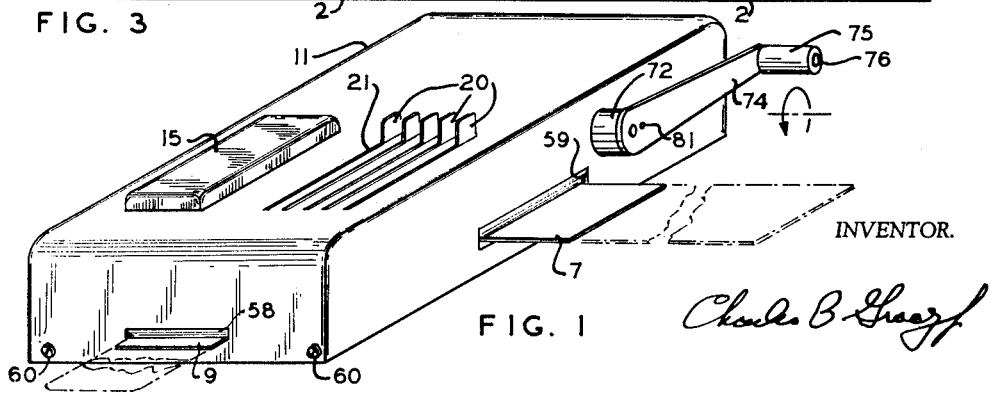
INVENTOR.
Charles B. Grady Jr Nov. 14, 1961  C. B. GRADY, JR  3,008,632
CARD READING CARD PUNCH Filed April 24, 1961  2 Sheets-Sheet 2

INVENTOR.
Charles B. Grady Jr.

United States Patent Office 3,008,632
Patented Nov. 14, 1961

3,008,632
CARD READING CARD PUNCH
Charles B. Grady, Jr., 1 Ridgeway Ave.,
West Orange, N.J.
Filed Apr. 24, 1961, Ser. No. 105,136
6 Claims. (Cl. 234—42)

This invention relates to an improved low cost mechanical device for automatically reading information punched into an identification card and subsequently punching this information together with other manually preset information into a tubular record card.

Such a transfer of information is useful at a point of sale operation in which a customer's credit card is prepunched with his account number. This identifying credit card can then be presented to the subject device after the salesman has manually set the amount and class of the sale into it, and the device can produce a tabular record card into which all the pertinent data of the transaction has been recorded by punching.

Transcribing tabular punches capable of such an operation are well known in the art, but heretofore have been so complicated and expensive as to discourage their use as a widespread point of sale device.

The present invention meets the cost requirements of point of sale economics by teaching a novel design for multiple die punches which leads to great economy of fabrication.

An important feature of my invention is the use of a composite "egg crate" design of multiple dies in which the columnar walls of the dies also form positioning guide cams for a moveable punch, thereby greatly reducing the mechanical tolerances required in the cooperating parts to achieve clean punching.

Another feature of my invention is the provision of duplicating punch means whereby manually set information relating to a transaction can be punched simultaneously at two locations on a separable two-part tabular record card so as to provide a receipt for the customer as well as a record for the salesman in a point-of-sale recording operation.

One object of my invention is to provide an inexpensive and reliable point-of-sale punch.

A second object is to provide a composite construction for multiple die punches in which the walls of the dies form the entering guides for the punches.

A third object is to provide a selective mechanical punching structure which aligns an identification card, seeks and reads punched information in said card, positions a punch for reproducing said information, and ejects said card after punching.

A fourth object is to provide a manually set card punch which will simultaneously punch in multiple the information manually set therein, at a plurality of locations on a separable record card.

Other objects are implicit in the subject specifications and claims.

Figure 4:
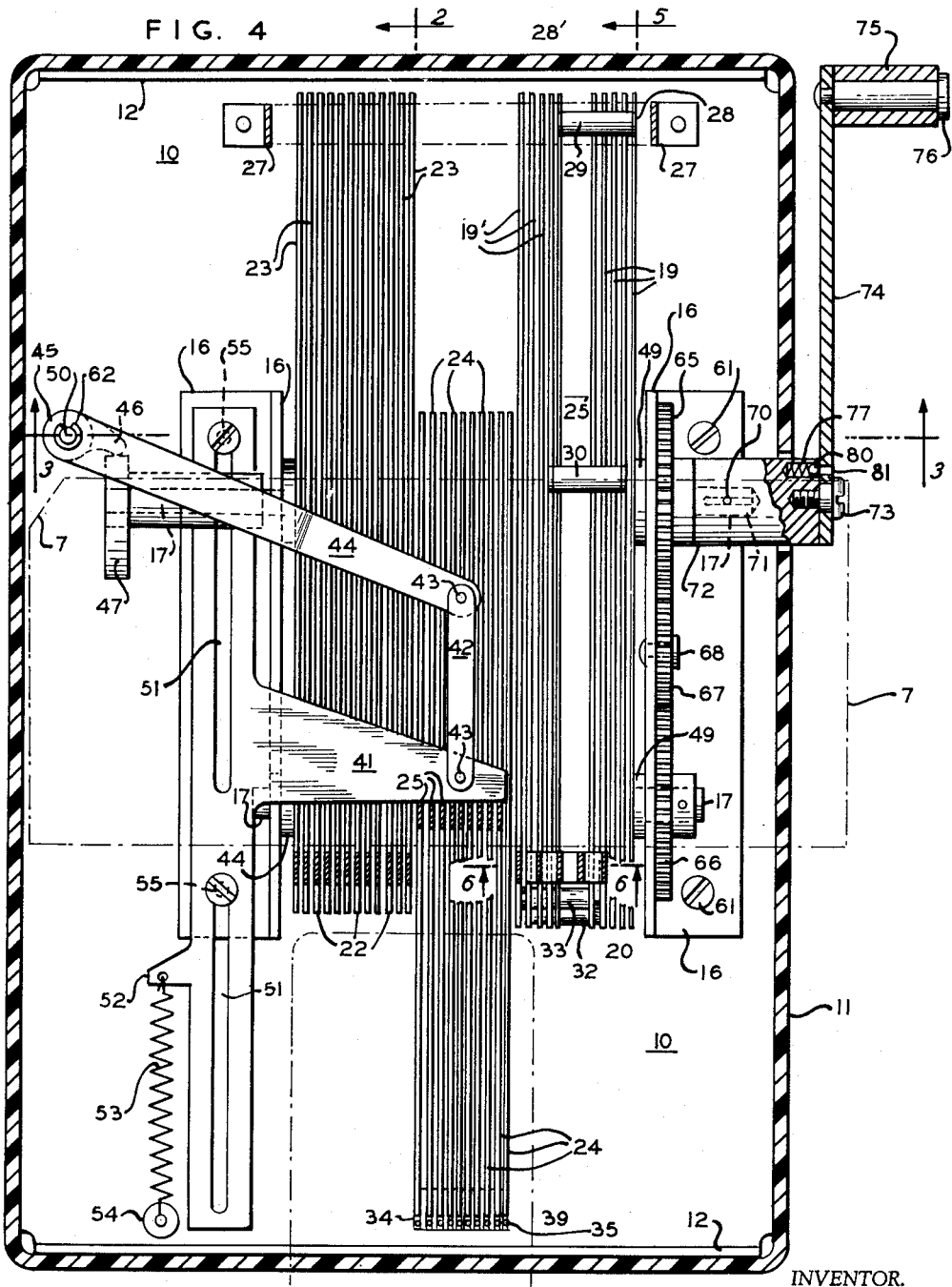
Figure 6:
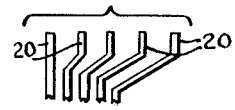

In the drawings:
FIG. 1 is a perspective view of the exterior of the preferred embodiment of my invention;
FIG. 2 is a transverse section in elevation through a reading-punching column of the machine illustrated in FIG. 1;
FIG. 3 is a longitudinal section through 3—3 of FIG. 2;
FIG. 4 is a plan view through 4—4 of FIG. 2;
FIG. 5 is a transverse section through a manually set column at 5—5 of FIG. 4; and
FIG. 6 is a detail through 6—6 of FIG. 4.

Referring to the drawings, the composite multiple die of the preferred embodiment of my card punch is formed by the orthogonal intermeshing of the column-defining plates 1 with the row-defining combs 2. Each plate 1 is provided with a card slot 6, for admitting a tabular record card 7, and with a plurality of locating cam slots 4 extending substantially normal to the said card slot and located on the side of this card slot opposite the location of row defining combs 2.

In this way, the ends of the rectangular tines of combs 2 together with the adjacent sides of slots 6 form a coplanar grid which comprise a plurality of die cavities through which record forming rectangles of card 7 may be punched.

Plates 1 and their intermeshing combs 2 are assembled together by means of the rods 3 and spacing washers 3'. Rods 3 extend through and are suitably secured to the supporting end brackets 16, which, in turn, are secured to the chassis plate 10, at one end, by screws 61, and, at the other end, by the flush riveted posts 55.

End plates 16 form the journals of the parallel shafts 17 to which are integrally secured the eccentric cam cylinders 18. Further, shafts 17 are positively coupled together in synchronized rotation by the gears 65 and 66 through their common intermeshing with the idler gear 67 which is journalled on end bracket 16 by stud 68.

Four sets of cam-following slides 19, 19', 24, and 23 embrace and are supported on the parallel eccentric cylinders 18; these slides are spaced apart by washers 49. Each such slide is provided with an integral rectangular punch 56 which rides between two plates 1 so as to be capable of being positioned above any one of the foregoing die cavities in a given column.

Also, each punch 57 is provided with a cam-following pin 57 each of which, on the simultaneous downward displacement of all the slides 19, 19', 24, and 23, enters the tapered entrance duct 5 of one positioning cam 4 and thereby accurately locates and guides the punch 56 to register with and enter the corresponding die cavity.

It is due to the fact that the location of the punch by slots 4, and the location of the die cavities formed by combs 2 are both determined by the dimensions of a single stamping that my invention can be manufactured so economically.

This registering and punching descent of all the punches 57 is accomplished by the manual rotation through 180° of handle 75, which is secured to crank 74 by stud 76. Crank 74 is, in turn, coupled through hub 72 to a slotted extension of shaft 17, by the pin 70. Consequently, the foregoing actuation of handle 75 causes the eccentric drive cams 18, acting as in a scotch yoke, to force the pin-guided punches 56 to pierce card 7 in the preselected pattern. Since the cam slots in the slide sets 19, 19', 23, and 24 are of the box-cam type, the return of handle 75 to the starting position, illustrated in FIG. 1, will positively withdraw the punches 56 upward from the composite die, and free card 7 for withdawal, and punches 56 for repositioning.

It may be seen in FIG. 4 that crank 74 is secured to hub 72 in a torque limiting manner by means of stud 73 and the yieldable detenting action of ball 80 acting on detent hole 81, under the predetermined force of spring 77. In this way, damage to the punches and dies is prevented in the event of an obstruction to the normal punching action. The pin 70 in hub 72 engages the slot 71 in shaft 17 so that the entire crank assembly can be axially withdrawn from the machine. This permits assembly of the plastic moulded cover 11 to the upturned ears 12 of chassis plate 10 by means of screws 60.

In FIGS. 4 and 5 it may be seen that the two sets of five punch-slides 19 and 19' are located on either side of the perforations in card 7 which divide it into a smaller receipt portion and a larger invoice portion. The purpose of these two sets of punches 19 and 19' is to record the monetary amount of the transaction identically on both the receipt and the invoice portions of card 7. To accomplish this purpose, the two rightmost slides 19 and 19', which correspond to the pennies value of the transaction, are mechanically coupled together by the doubly riveted stud 29.

It is to be noted that the location of the coupling link 29 on their slides 19 and 19' is such that no mechanical interference takes place over the full twelve die-position stroke of this pair regardless of the positions of the other slides.

Similarly, the dime value slides are coupled in this non-interfering manner by stud 30; the dollar slides are coupled by stud 31; the ten-dollar slides are coupled by stud 32; and the hundred dollar slides are coupled by stud 33. It may be seen that the opening up of one end of the box cam slots of slides 19 and 19' is necessary to permit non-interference of stud 33, since the remaining alternative would be to increase the size of the whole machine by the length of a slide's throw.

The setting tabs 20, integral with slides 19' only, may be seen in FIGS. 1, 4, 5 and 6 to project through slots 21 in cover case 11 for easy manual setting of these duplicating punch slides. The splaying configuration illustrated in FIG. 6 permits the expansion of the columnar zoning from the close zoning required by the record card 7, to a convenient spacing for setting manipulation.

A detent spring finger 63 secured to each of the slides 19 and 22 is provided to engage the cam notches 5 and 8, so as to assure correct approximate registration. The final accurate positioning, as before described, is accomplished by pins 57 acting in slots 4.

The next adjacent set of punch slides 24 (FIGS. 2 and 4) are intended to be set automatically by sensing the position of holes 82 punched in credit card 9 in accordance with an account number. For this purpose, each slide 24 is provided with a seeking finger 35 riveted to the U shaped frame 34 which, in turn, is slideably secured to slide 24 by pins 36, acting in limiting slots 37. A spring 39, acting between tab 38 integral with frame 34 and stud 40 secured to slide 24, urges sensing pin 35 downward, so that, as slide 24 moves to the right of the home position shown in FIG. 2, pin 35 will slide over the surface of credit card 9 until it finds and drops into a hole 82, thereby leaving the corresponding punch 56 poised over the die aperture called for in that columnar position.

After punching, the return of slides 24 to the position shown, first pulls the card leftward out of the aperture 58 in case 11 and, finally this return motion by the action of cam lip 14, integral with the chassis plate 10, on the cooperating cam surface in frame 34, causes pins 35 to withdraw upward out of engagement with card 9, thus leaving card 9 free for manual removal from slot 53. The motion of frame 34 relative to slide 24 is limited by slots 37 so that, during the punching stroke, the pins 35 simply slide deeper beyond the stationary card 9.

The foregoing hole seeking operation is made possible by the permissive action of springs 26 (FIG. 2) each of which urges one slide 24 through tab 25 to the right where the springs 26 are anchored to bracket 27, secured to chassis 10.

However, slides 24 are prevented from motion to the right by presence of control slide 41 in front of the spring tabs 25. Slide 41 is provided with slots 51 which cooperate with the shoulders on posts 55 to guide and support it. Spring 53, acting between tab 52 on slide 41 and the anchor post 54 secured to chassis 10, is chosen to have sufficient force and stroke so that it will overcome the total opposing forces of springs 26.

Consequently, in the absence of other forces, slides 24 will be forced to the home position shown in FIG. 2.

However, when handle 75 is operated, the rotation of shaft 17 carries with it the hub 17 and integral cam 47, which are secured to one end of shaft 17.

Cam 47, in turn, acts on the rigidly interconnected cam following lever 46, sleeve 45, and drive lever 44, which together are journalled on post 50 secured to chassis 10. Snap ring 62 retains sleeve 45 on post 50. The resulting counterclockwise displacement (FIG. 4) of lever 44 about post 50, draws with it slide 41 by means of link 42, acting through pivot pins 43.

This overcoming of spring 53 by the manually applied force on handle 75 causes withdrawal of slide 41 from constraint of tabs 25 so that each slide 24 moves permissively forward under the urging of its spring 26 until it has located its value position, as determined by the location of a hole 82 in card 9, and where it stops and punches.

The design of cam 47 and the phasing of eccentric cams 18 relative to the crank 74 is such that, during the first 60° of crank motion, all the punch slides move first upward slightly, and then return to the starting position during the time that slide 41 is withdrawn and all the punch slides 24 have found their card-coded positions.

Further rotation of the crank 74 then effects the punching as before described. On return of handle 75 to the starting position, cam 47 releases its counterclockwise torque on lever 44, thereby allowing spring 53 to restore the seeking pins 35, and ejecting the credit card 9 from slot 58.

The punch slides 23 are reserved for transaction data which does not change frequently, such as store number, district designation, and date. For this reason, it is not necessary to splay their setting handles 22 as in the case of tabs 20. A cover 15 is hinged to casing 11 to protect the setting handles 22 when they are not being set by a manually held stylus.

The operation of my invention is as follows:

Let it be presumed that the punch is to be used in a gasoline station to record the transaction in which a motorist wishes to charge the purchase of gasoline to his account. The motorist first presents his prepunched credit card to the station attendant, who inserts the card 9 into slot 58 of the subject machine. The attendant then inserts a two part perforated invoice-receipt card into slot 59, and enters the amount of the transaction by positioning levers 20 within slots 21.

The attendant then grasps handle 74 and reciprocates it 180° forward and 180° back. This action first drops seeking fingers 35 on to card 9 and reads the information as to the motorist's account number, by locating the corresponding punch slides 24. Further motion of crank 74 then simultaneously punches this transcribed credit card number, by slides 24, and the fixed date and location information which previously had been set on slides 23, by levers 22. In addition, the amount of the transaction, which had been set in slides 19 and 19', is also simultaneously punched both into the invoice section and into the receipt portion of card 7.

On completion of the stroke of handle 75, the attendant removes the ejected credit card 9 and returns it to the motorist together with the receipt portion of card 7 which he tears off along its perforations, after removing it from slot 59.

Many changes and substitutions are possible within the scope of my invention, and it is not intended that the specific design here shown shall limit the breadth of the claims.

What I claim is:

1. In a multiple die card punch, the combination comprising: a plurality of parallel spaced column defining plates; a card slot in each said column plate; a plurality of cam slots substantially normal to and lying on one side of said card slot in each said column plate; a plurality of row defining combs embracing said column plates on the side of said slot opposite from said cam slots; a first punch member; first cam follower means secured to said punch member; guide means to permit displacement of said punch member parallel to said columns; and punching means to move said punch member normal to said card slot whereby to engage said first cam follower means with at least one of said cam slots and to cause said punch member to enter one of the dies formed by said column plates and said row combs.

2. In a punch according to claim 1, a perforated control card, and means responsive to the location of a perforation in said control card relative to its edges for positioning said punch member along said guide means adjacent to a die location determined by said perforation location.

3. In a punch according to claim 1: a first shaft journalled on an axis parallel to said rows; a second shaft journalled on an axis parallel to said first shaft; coupling means to interlock the rotation of said first and second shafts; a first eccentric cam means mounted on said first shaft; a second eccentric cam means mounted on said second shaft; said punching means comprising second cam follower means embracing said first and second cam means.

4. In a punch according to claim 1: a second punch member; a third cam follower means embracing said first and second cam means and secured to said second punch member; guide means to permit displacement of said second punch member parallel to said columns and in columnar spaced relation to said first punch member; coupling means for linking the displacements of said first and second punch members whereby both will punch in the same row.

5. In a multiple die and punch set for puching cards, the combination comprising: a plurality of parallel spaced column defining plates; a card slot in each said column plate; a plurality of guide cam slots in the edge of each said column plate substantially normal to anr lying on one side of said card slot; a plurality of equally spaced notches in the edge of said column plate remote from said guide slots; a plurality of row defining combs meshing with said notches and having its teeth terminate at the edge of said card slot; a plurality of punches; and cam following means secured to each said punch adapted to be guided by said guide slots.

6. In a point of sale recorder, the combination comprising: a first holder for tubular record cards having rows and columns; a first plurality of card punching means each manually adjustable to punch in a plurality of rows of said record card; a second plurality equal to said first plurality of card punching means each adjustable to punch in a plurality of rows of said record card; coupling means between each of said first plurality of punching means and a corresponding one of said second plurality of punching means whereby the manual adjustment of one of said first plurality of punching means to a given row adjusts the corresponding punching means of said second plurality to the same row; a second holder for identification cards having punched holes lying in rows and columns; a third plurality of card punching means each adjustable to punch in a plurality of rows of said record card; hole sensing means to adjust said third plurality of punching means to conform to the hole patterns in the identification card held by said second card holding means; a fourth plurality of card punching means each manually adjustable to punch in a plurality of rows of said record card; and manually operated sequencing means to actuate the adjustment of said hole sensing means, and subsequently to actuate all of said card punching means to punch said record card.

References Cited in the file of this patent
UNITED STATES PATENTS

| | | |
|---|---|---|
| 2,791,275 | Hool | May 7, 1957 |
| 2,964,239 | Whitson | Dec. 13, 1960 |
| 2,994,473 | Farmer et al. | Aug. 1, 1961 |